(12) United States Patent
Watanabe

(10) Patent No.: US 9,981,598 B2
(45) Date of Patent: May 29, 2018

(54) ALIGHTING NOTIFICATION DEVICE

(71) Applicants: AutoNetworks Technologies, Ltd., Yokkaichi, Mie (JP); Sumitomo Wiring Systems, Ltd., Yokkaichi, Mie (JP); SUMITOMO ELECTRIC INDUSTRIES, LTD., Osaka-shi, Osaka (JP)

(72) Inventor: Tatsuya Watanabe, Mie (JP)

(73) Assignees: AutoNetworks Technologies, Ltd., Yokkaichi, Mie (JP); Sumitomo Wiring Systems, Ltd., Yokkaichi-shi, Mie (JP); Sumitomo Electric Industries, Ltd., Osaka-shi, Osaka (JP)

( * ) Notice: Subject to any disclaimer, the term of this patent is extended or adjusted under 35 U.S.C. 154(b) by 0 days. days.

(21) Appl. No.: 15/558,355

(22) PCT Filed: Mar. 11, 2016

(86) PCT No.: PCT/JP2016/057726
§ 371 (c)(1),
(2) Date: Sep. 14, 2017

(87) PCT Pub. No.: WO2016/152574
PCT Pub. Date: Sep. 29, 2016

(65) Prior Publication Data
US 2018/0079356 A1 Mar. 22, 2018

(30) Foreign Application Priority Data
Mar. 20, 2015 (JP) ................. 2015-057633

(51) Int. Cl.
*B60Q 1/26* (2006.01)
*B60Q 1/50* (2006.01)
*G08G 1/16* (2006.01)

(52) U.S. Cl.
CPC .............. *B60Q 1/50* (2013.01); *G08G 1/166* (2013.01)

(58) Field of Classification Search
CPC ........ G08G 1/166; G08G 1/168; G08G 1/005; B60Q 1/50; B60Q 2900/30; B60Q 1/52;
(Continued)

(56) References Cited

U.S. PATENT DOCUMENTS

| 4,667,195 A | 5/1987 | Kodera et al. | |
|---|---|---|---|
| 2007/0046446 A1* | 3/2007 | Chang .................. | B60Q 9/008 340/426.28 |

(Continued)

FOREIGN PATENT DOCUMENTS

| JP | S60-092135 A | 5/1985 |
|---|---|---|
| JP | H05-162586 A | 6/1993 |

(Continued)

OTHER PUBLICATIONS

Search Report for PCT/JP2016/057726, dated Jun. 14, 2016.

*Primary Examiner* — Anh V La
(74) *Attorney, Agent, or Firm* — Dinsmore & Shohl LLP

(57) ABSTRACT

An alighting notification device configured to identify when an occupant will get out of a vehicle, only when necessary is provided. The alighting notification device includes: an alighting determination unit that determines whether or not an occupant will get out of the vehicle; a surrounding area determination unit that determines whether or not a person or another vehicle in a surrounding area around the vehicle is approaching the vehicle; and a notification unit that notifies of alighting based on a result of determination by the alighting determination unit and a result of determination by the surrounding area determination unit. For example, when it has been determined that an occupant will get out of the vehicle, if a person or another vehicle is approaching the (Continued)

vehicle, the notification unit notifies the external target of alighting.

7 Claims, 8 Drawing Sheets

(58) Field of Classification Search
CPC . B60Q 1/525; B60Q 1/46; B60Q 1/28; B60Q 3/267; B60Q 1/503; B60Q 1/26; B60Q 1/24; B60Q 1/38; B60Q 1/2607; B60Q 1/32; B60Q 5/006; B60Q 1/34; B60Q 2400/40; B60Q 11/007; B60Q 1/488; B60Q 2300/42; B60Q 3/14
USPC ....... 340/468, 463, 458, 461, 464, 471, 472, 340/465, 475, 479, 457, 425.5, 426.28, 340/470
See application file for complete search history.

(56) References Cited

U.S. PATENT DOCUMENTS

| | | | |
|---|---|---|---|
| 2008/0218381 A1* | 9/2008 | Buckley | B60Q 1/50 340/932.2 |
| 2011/0196568 A1* | 8/2011 | Nickolaou | B60W 30/0953 701/31.4 |
| 2014/0297173 A1* | 10/2014 | Li | G08G 1/056 701/301 |

FOREIGN PATENT DOCUMENTS

| | | |
|---|---|---|
| JP | H06-107069 A | 4/1994 |
| JP | 2015-039979 A | 3/2015 |

\* cited by examiner

ALIGHTING NOTIFICATION DEVICE

CROSS-REFERENCE TO RELATED APPLICATIONS

This application is the U.S. national stage of PCT/JP2016/057726 filed Mar. 11, 2016, which claims priority of Japanese Patent Application No. JP 2015-057633 filed Mar. 20, 2015.

TECHNICAL FIELD

The present invention relates to an alighting notification device that notifies of the fact that an occupant will get out of a vehicle.

BACKGROUND

In recent years, the computerization of automobiles has progressed, and technical developments have been made in various aspects from the viewpoints of safety, environment, information, comfort, and so on. From the viewpoint of safety, there is technology for, when a door of the vehicle is to be opened, notifying an external target, in advance, of the fact that the door will be opened, in order to prevent a person or another vehicle from hitting the opened door.

For example, "LAMP FOR WARNING OPENING OF DOOR IN ADVANCE" is disclosed (see JP H6-107069A), according to which a warning lamp that emits light rearward is provided on a rear end surface of a side molding that is provided on a side surface of an automobile, the rear end surface being divided from the side molding by a door, and the warning lamp is turned on in response to a door handle inside the automobile being operated within the range of play of the door handle.

However, the warning lamp according to JP H6-107069A is turned on every time the door handle is operated. Therefore, there is a problem in which the warning lamp is turned on even when the warning lamp does not need to be turned on such as when there are no people or other vehicles around the automobile. There is also a problem in which power is wastefully consumed.

The present invention has been made in view of such a situation, and aims to provide an alighting notification device that is able to notify of the fact that an occupant will get out of a vehicle, only when necessary.

SUMMARY

The alighting notification device according to the present invention includes: an alighting determination unit that determines whether or not an occupant will get out of the vehicle; a surrounding area determination unit that determines whether or not a person or another vehicle in a surrounding area around the vehicle is approaching the vehicle; and a notification unit that notifies of alighting based on a result of determination by the alighting determination unit and a result of determination by the surrounding area determination unit, wherein the notification unit is configured to, if the alighting determination unit determines that an occupant will get out of the vehicle from one side of the vehicle, and the surrounding area determination unit determines that a person or another vehicle in an area that is on the one side and is forward of the vehicle is approaching the vehicle, light up or blink a front indicator light that is provided on the one side of the vehicle, and if the alighting determination unit determines that an occupant will get out of the vehicle from one side of the vehicle, and the surrounding area determination unit determines that a person or another vehicle in an area that is on the one side and is rearward of the vehicle is approaching the vehicle, light up or blink a rear indicator light that is provided on the one side of the vehicle.

The alighting determination unit determines whether or not an occupant will get out of the vehicle. The alighting determination unit can determine whether or not an occupant will get out of the vehicle by acquiring a detection signal generated by door handle sensors that are respectively provided for the doors of the vehicle and each detect opening/closing of a door. The alighting determination unit may determine whether or not an occupant will open a door and get out of the vehicle, based on an image of the surroundings of the doors of the vehicle captured by an in-vehicle camera.

The surrounding area determination unit determines whether or not a person or another vehicle in a surrounding area around the vehicle is approaching the vehicle. The surrounding area determination unit can determine whether or not a person or another vehicle in a surrounding area around the vehicle is approaching the vehicle, based on surroundings information such as image data that is captured by a video camera that can capture an image of the surroundings of the vehicle, or detection data that is detected by a radar or a sensor that can detect an object around the vehicle.

The notification unit notifies of alighting based on a result of determination by the alighting determination unit and a result of determination by the surrounding area determination unit. For example, when it has been determined that an occupant will get out of the vehicle, if a person or another vehicle is approaching the vehicle, the notification unit notifies the external target of the alighting. As a result, when an occupant will get out of the vehicle, if a person or another vehicle is present in a surrounding area around the vehicle, notification of alighting is performed. Therefore, it is possible to prevent a door from coming into contact with or hitting a person or another vehicle when the occupant opens the door, and it is possible to notify of the fact that an occupant will get out of the vehicle, only when necessary. Also, since unnecessary notification is not performed, it is possible to reduce wasteful power consumption.

The front indicator light and the rear indicator light are respectively provided on a front portion and a rear portion on one side of the vehicle. The notification unit lights up or blinks the front indicator light if the alighting determination unit determines that an occupant will get out of the vehicle from the one side of the vehicle, and the surrounding area determination unit determines that a person or another vehicle in an area that is on the one side and is forward of the vehicle is approaching the vehicle. Also, the notification unit lights up or blinks the rear indicator light if the alighting determination unit determines that an occupant will get out of the vehicle from the one side of the vehicle, and the surrounding area determination unit determines that a person or another vehicle in an area that is on the one side and is rearward of the vehicle is approaching the vehicle.

As a result, for example, if a person or another vehicle is approaching the vehicle from forward thereof, the notification unit lights up or blinks the front indicator light. Therefore, a person or another vehicle that is approaching the vehicle from forward thereof can easily recognize the front indicator light that is provided on the front portion of the vehicle, and avoid coming into contact with or hitting a door. Also, since it is unnecessary to light up or blink the rear indicator light, it is possible to reduce wasteful power consumption. When a person or another vehicle is approaching the vehicle from rearward thereof, the notification unit lights up or blinks the rear indicator light. Therefore, a person or another vehicle that is approaching the vehicle from rearward thereof can easily recognize the rear indicator light that is provided on the rear portion of the vehicle, and avoid coming into contact with or hitting against a door. Also, since it is unnecessary to light up or blink the front indicator light, it is possible to reduce wasteful power consumption.

In the alighting notification device according to the present invention, the notification unit is configured to notify of alighting if the alighting determination unit determines that an occupant will get out of the vehicle from one side of the vehicle, and the surrounding area determination unit determines that a person or another vehicle in an area on the one side is approaching the vehicle.

The notification unit notifies of alighting if the alighting determination unit determines that an occupant will get out of the vehicle from one side of the vehicle, and the surrounding area determination unit determines that a person or another vehicle in an area on the one side is approaching the vehicle. For example, when an occupant is about to open a right door of the vehicle and get out of the vehicle, if a person or another vehicle in an area on the right side (in a forward direction, a lateral direction, a rearward direction, etc.) of the vehicle is approaching the vehicle, the notification unit notifies of alighting. Also, when an occupant is about to open a left door of the vehicle and get out of the vehicle, if a person or another vehicle in an area on the left side (in a forward direction, a lateral direction, a rearward direction, etc.) of the vehicle is approaching the vehicle, the notification unit notifies of alighting. As a result, it is determined whether or not a person or another vehicle in a surrounding area on the side from which an occupant will get out of the vehicle is approaching the vehicle, and therefore it is possible to notify of alighting only when necessary. Also, since unnecessary notification is not performed, it is possible to reduce wasteful power consumption.

In the alighting notification device according to the present invention, the notification unit is configured to, if the alighting determination unit determines that an occupant will get out of the vehicle from one side of the vehicle, and the surrounding area determination unit determines that a person or another vehicle in an area on the one side is approaching the vehicle, light up or blink an indicator light that is provided on the one side of the vehicle.

An indicator light is provided on one side of the vehicle (e.g. the right side or the left side of the vehicle). The indicator light may be realized using, for example, a hazard lamp, a brake lamp, or the like, or separately provided as an additional warning light. The notification unit lights up or blinks the indicator light if the alighting determination unit determines that an occupant will get out of the vehicle from one side of the vehicle, and the surrounding area determination unit determines that a person or another vehicle in an area on the one side is approaching the vehicle. Since the notification unit lights up or blinks the indicator light when a person or another vehicle in a surrounding area on the side from which an occupant will get out of the vehicle is approaching the vehicle, it is possible to reliably notify the person or the other vehicle of alighting.

In the alighting notification device according to the present invention, the notification unit is configured to not notify of alighting if the alighting determination unit determines that an occupant will get out of the vehicle from one side of the vehicle, and the surrounding area determination unit determines that a person or another vehicle in an area on the other side of the vehicle is approaching the vehicle.

The notification unit does not notify of alighting if the alighting determination unit determines that an occupant will get out of the vehicle from one side of the vehicle, and the surrounding area determination unit determines that a person or another vehicle in an area on the other side of the vehicle is approaching the vehicle. For example, if an occupant opens a door on the right side and gets out of the vehicle, that occupant will not open a door on the left side. Therefore, even if a person or a vehicle in an area on the left side of the vehicle is approaching the vehicle, there is no risk of a door coming into contact with or hitting the person or the other vehicle. As a result, unnecessary notification is not performed, and therefore it is possible to reduce wasteful power consumption.

Advantageous Effects

The present invention is able to notify of the fact that an occupant will get out of a vehicle, only when necessary.

DETAILED DESCRIPTION OF PREFERRED EMBODIMENTS

Figure 1:
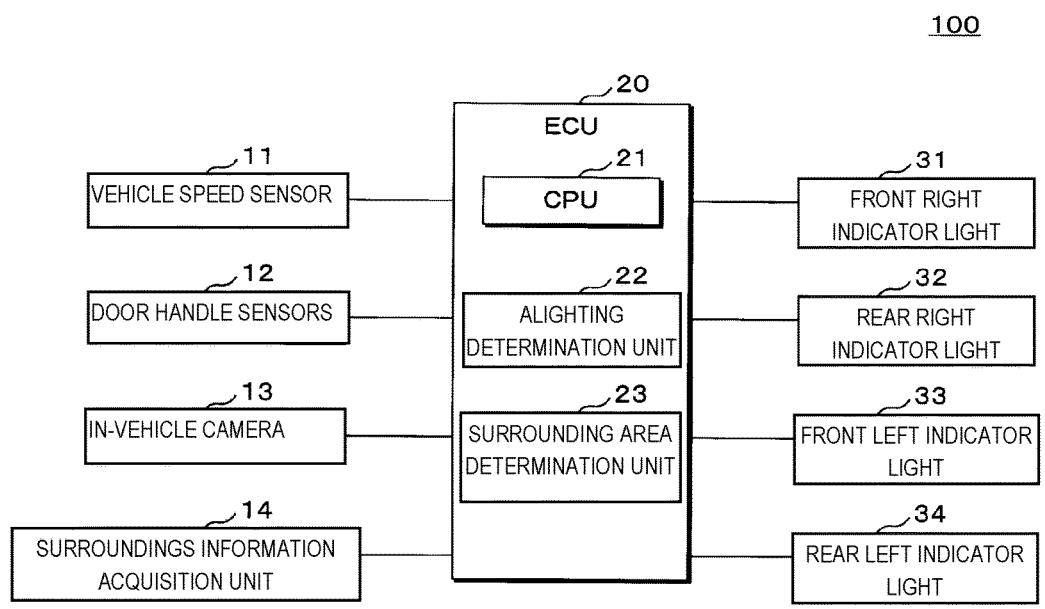
FIG. 1 is a block diagram showing an example of a configuration of an alighting notification system according to the present embodiment.

The following describes the present invention based on drawings that show an embodiment of the present invention. FIG. 1 is a block diagram showing an example of a configuration of an alighting notification system 100 according to the present embodiment. In FIG. 1, an ECU 20 is an example of an alighting notification device. The ECU 20 includes a CPU 21 that controls the entire ECU, an alighting determination unit 22, a surrounding area determination unit 23, and so on. Also, as shown in FIG. 1, a vehicle speed sensor 11, door handle sensors 12, an in-vehicle camera 13, a surroundings information acquisition unit 14, a front right indicator light 31, a rear right indicator light 32, a front left indicator light 33, a rear left indicator light 34, and so on are connected to the ECU 20.

The vehicle speed sensor 11 detects the speed of the vehicle, and outputs the result of detection (vehicle speed information) to the ECU 20.

The door handle sensors 12 may be touch sensors or human sensors, for example, and are respectively provided for the doors of the vehicle (the vehicle on which the ECU 20 is mounted). The door handle sensors 12 each detect the opening/closing of the corresponding door, and outputs the result of detection (e.g. whether or not an operation to open/close the door has been performed) to the ECU 20. If a door handle sensor 12 is ON, it can be determined that an operation to open the corresponding door has been performed. Note that an operation to open a door corresponds not only to a situation where the door has started to open, but also to a situation immediately before the door starts to open, where the door is not open yet, but is about to open.

The in-vehicle camera 13 is provided to capture an image of the surroundings of the doors of the vehicle. Only one in-vehicle camera 13 may be provided, but a plurality of in-vehicle cameras 13 may be provided respectively for the doors. The in-vehicle camera 13 detects whether or not an occupant has opened a door, based on the captured image, and outputs the result of detection (e.g. whether or not an operation to open/close the door has been performed) to the ECU 20.

The surroundings information acquisition unit 14 may be a camera that captures an image of a surrounding area around the vehicle, a radar, an ultrasonic sensor, or the like. The surroundings information acquisition unit 14 detects a person or another vehicle that is present in a surrounding area around the vehicle, at a predetermined frequency, and outputs the result of detection (the presence or absence of a person or another vehicle), which serve as surroundings information, to the ECU 20. The result of detection may include information such as identification information that identifies a person or another vehicle, a distance to a person or another vehicle, the moving speed of a person or another vehicle, and the moving direction (the orientation) of a person or another vehicle.

The alighting determination unit 22 determines whether or not an occupant will get out of the vehicle, based on the detection results output from the vehicle speed sensor 11, the door handle sensors 12, and the in-vehicle camera 13. Note that when performing alighting determination, it is possible to use only the detection results output from either the door handle sensors 12 or the in-vehicle camera 13.

The surrounding area determination unit 23 determines whether or not a person or another vehicle in a surrounding area around the vehicle is approaching the vehicle, based on the result of detection output from the surroundings information acquisition unit 14.

The CPU 21 functions as a notification unit, and notifies of alighting, to a person who is approaching the vehicle or the driver or an occupant of another vehicle, based on the result of determination from the alighting determination unit 22 and the result of determination from the surrounding area determination unit 23, using one or more or all of the front right indicator light 31, the rear right indicator light 32, the front left indicator light 33, and the rear left indicator light 34. The front right indicator light 31 and the front left indicator light 33 are also referred to as front indicator lights, and the rear right indicator light 32 and the rear left indicator light 34 are also referred to as rear indicator lights.

The front right indicator light 31 is an indicator light that is provided on a front right portion of the vehicle, the rear right indicator light 32 is an indicator light that is provided on a rear right portion of the vehicle, the front left indicator light 33 is an indicator light that is provided on a front left portion of the vehicle, and the rear left indicator light 34 is an indicator light that is provided on a rear left portion of the vehicle. The front right indicator light 31, the rear right indicator light 32, the front left indicator light 33, and the rear left indicator light 34 may be realized using, for example, hazard lamps, brake lamps, or the like, or separately provided as additional lights.

For example, when it has been determined that an occupant will get out of the vehicle, if a person or another vehicle is approaching the vehicle, the external target (the person or the other vehicle that is approaching the vehicle) is notified. As a result, when an occupant will get out of the vehicle, if a person or another vehicle is present in a surrounding area around the vehicle, notification of alighting is performed. Therefore, it is possible to prevent a door from coming into contact with or hitting a person or another vehicle when the occupant opens the door, and it is possible to notify of the fact that an occupant will get out of the vehicle, only when necessary. Also, since unnecessary notification is not performed, it is possible to reduce wasteful power consumption.

Figure 2:
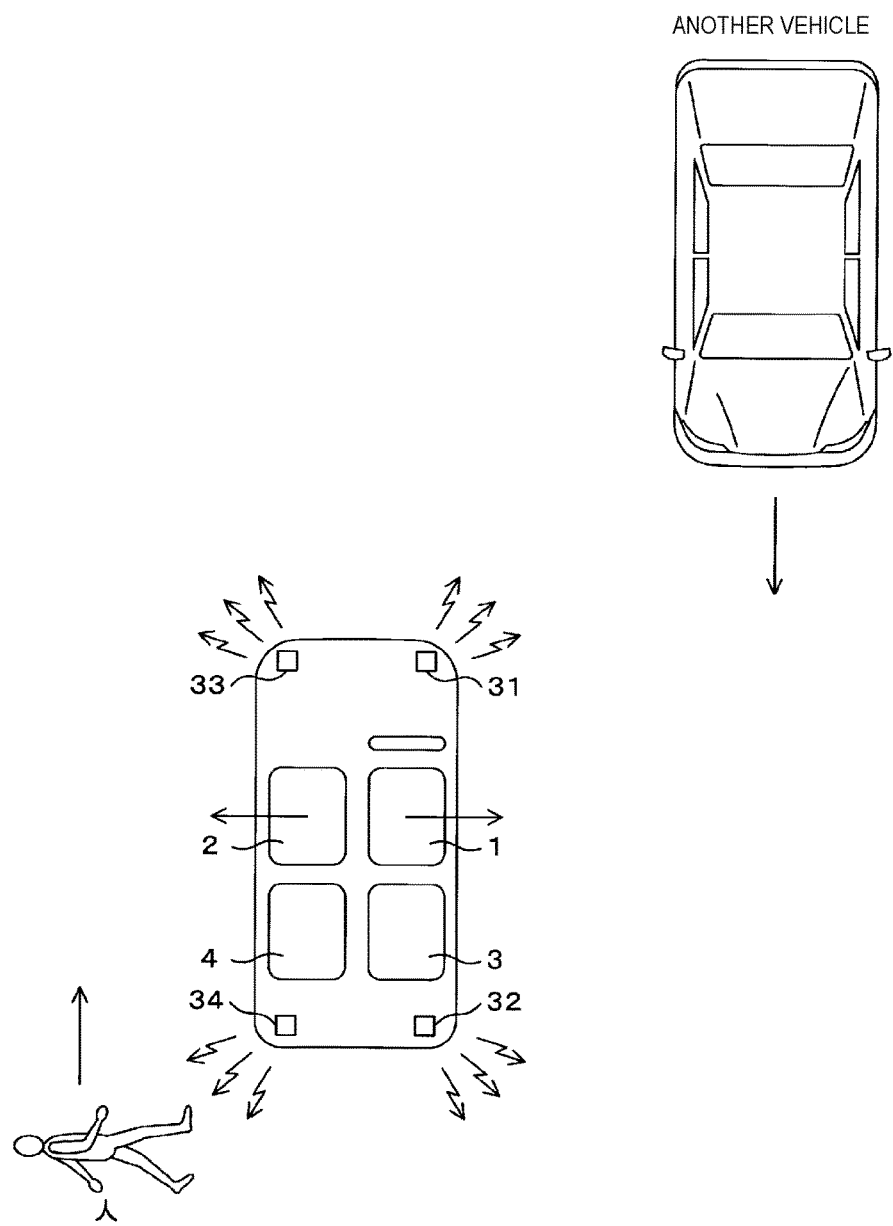
FIG. 2 is a schematic diagram showing a first example of alighting notification that is performed by an ECU according to the present embodiment.

Next, a specific example of notification of alighting will be described. FIG. 2 is a schematic diagram showing a first example of alighting notification that is performed by the ECU 20 according to the present embodiment. As shown in FIG. 2, it is assumed that the vehicle on which the ECU 20 is mounted (also referred to as "the driver's vehicle") is provided with a driver's seat 1, a passenger's seat 2, a rear right seat 3, and a rear left seat 4. Note that these seats are examples and are not limited to the examples shown in FIG. 2. Also, the front right indicator light 31 is provided on a front right portion of the driver's vehicle, the rear right indicator light 32 is provided on a rear right portion of the vehicle, the front left indicator light 33 is provided on a front left portion of the vehicle, and the rear left indicator light 34 is provided on the rear left portion of the vehicle. Horizontal arrows in the drawings each schematically show that an occupant is about to get out of the vehicle from the corresponding seat. In the example shown in FIG. 2, the arrows show that occupants in the driver's seat 1 and the passenger's seat 2 are about to get out of the vehicle.

As shown in FIG. 2, it is assumed that another vehicle in an area on the right side of the driver's vehicle is approaching the driver's vehicle from forward thereof. In this case, the CPU 21 lights up or blinks the front right indicator light 31 and the rear right indicator light 32, which are the right indicator lights of the driver's vehicle, to prevent the door of the driver's seat 1 from coming into contact with or hitting the other vehicle. That is, when an occupant is about to open a right door of the vehicle and get out of the vehicle, if a person or another vehicle in an area on the right side (in a forward direction, a lateral direction, a rearward direction, etc.) of the vehicle is approaching the vehicle, the CPU 21 notifies of alighting.

Also, as shown in FIG. 2, it is assumed that a person in an area on the left side of the driver's vehicle is approaching the driver's vehicle from rearward thereof. In this case, the CPU 21 lights up or blinks the front left indicator light 33 and the rear left indicator light 34, which are the left indicator lights of the driver's vehicle, to prevent the door of the passenger's seat 2 from coming into contact with or hitting the person. That is, when an occupant is about to open a left door of the vehicle and get out of the vehicle, if a person or another vehicle in an area on the left side (in a forward direction, a lateral direction, a rearward direction, etc.) of the vehicle is approaching the vehicle, the CPU 21 notifies of alighting.

As described above, when the alighting determination unit 22 has determined that an occupant will get out of the vehicle from one side (the right side or the left side) of the vehicle, if the surrounding area determination unit 23 determines that a person or another vehicle in an area on the one side (the right side or the left side) is approaching the vehicle, the CPU 21 notifies of alighting. As a result, it is determined whether or not a person or another vehicle in a surrounding area on the side from which an occupant will get out of the vehicle is approaching the vehicle, and therefore it is possible to notify of alighting only when necessary. Also, since the CPU 21 lights up or blinks indicator lights when a person or another vehicle in a surrounding area on the side from which an occupant will get out of the vehicle is approaching the vehicle, it is possible to reliably notify the person or the other vehicle of alighting.

Figure 3:
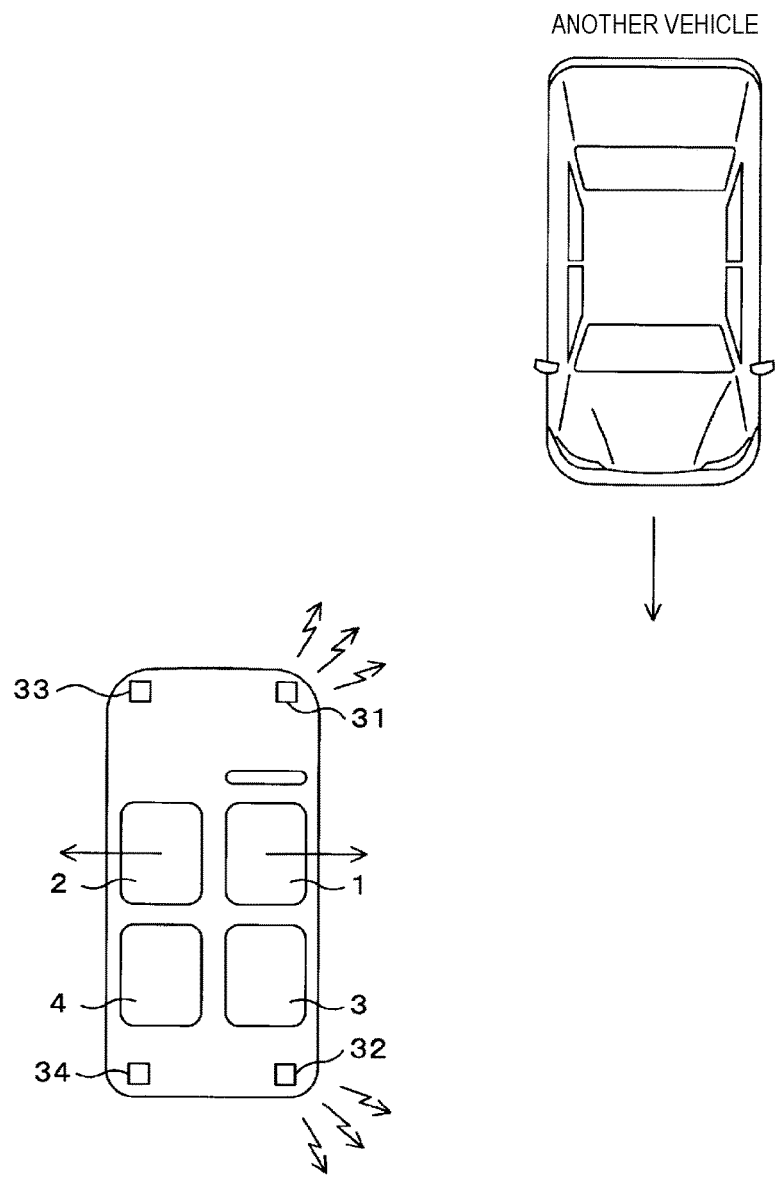
FIG. 3 is a schematic diagram showing a second example of alighting notification that is performed by the ECU according to the present embodiment.

FIG. 3 is a schematic diagram showing a second example of alighting notification that is performed by the ECU 20 according to the present embodiment. In the example shown in FIG. 3, as in FIG. 2, occupants in the driver's seat 1 and the passenger's seat 2 are about to get out of the vehicle. Meanwhile, in a surrounding area around the driver's vehicle, another vehicle in an area on the right side of the driver's vehicle is approaching the driver's vehicle from forward thereof. The difference from the example shown in FIG. 2 is that no people are approaching the driver's vehicle from the rear left side of the driver's vehicle.

In this case, as shown in FIG. 3, when the alighting determination unit 22 has determined that an occupant will get out of the vehicle from the right side of the vehicle, if the surrounding area determination unit 23 determines that a person or another vehicle in an area on the right side of the vehicle is approaching the vehicle, the CPU 21 notifies of alighting. In the example shown in FIG. 3, the CPU 21 lights up or blinks the front right indicator light 31 and the rear right indicator light 32, which are the right indicator lights of the driver's vehicle, to prevent the door of the driver's seat 1 from coming into contact with or hitting the other vehicle.

Also, when the alighting determination unit 22 has determined that an occupant will get out of the vehicle from the left side of the vehicle, if the surrounding area determination unit 23 determines that no people or other vehicles in an area on the left side of the vehicle are approaching the vehicle, the CPU 21 does not notify of alighting. In the example shown in FIG. 3, the CPU 21 does not light up or blink the front left indicator light 33 or the rear left indicator light 34. As a result, unnecessary notification is not performed, and therefore it is possible to reduce wasteful power consumption.

Figure 4:
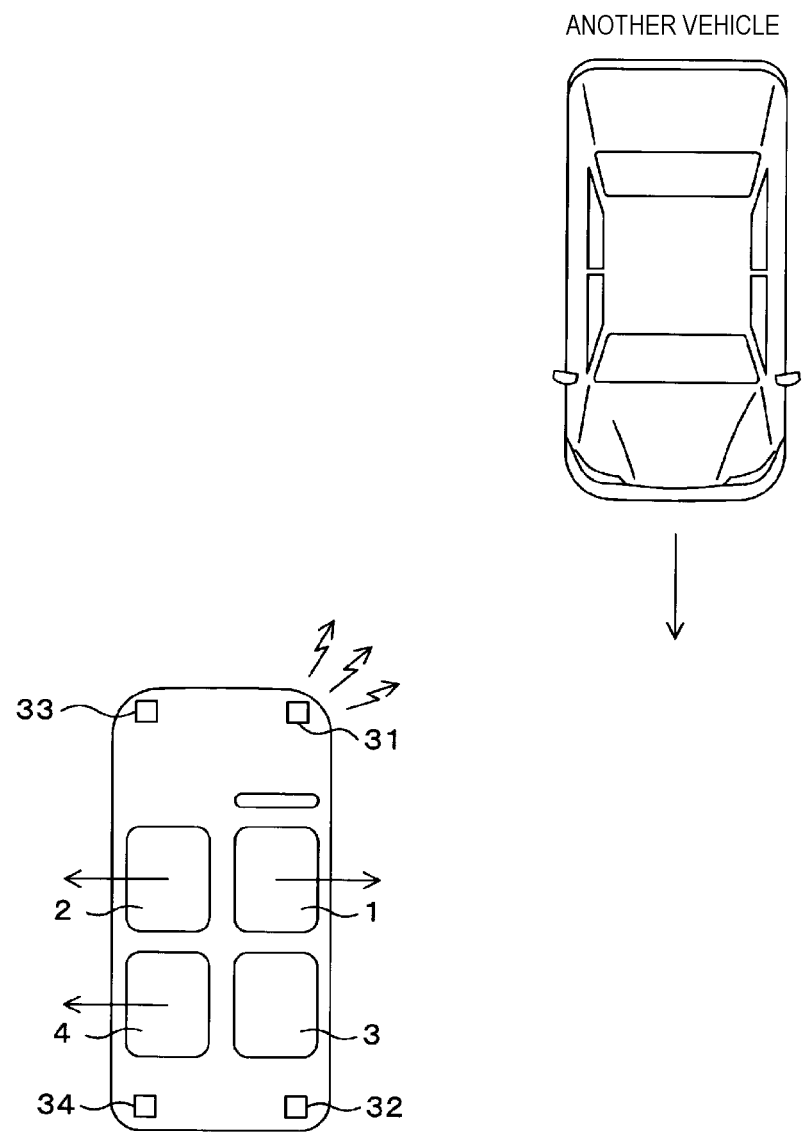
FIG. 4 is a schematic diagram showing a third example of alighting notification that is performed by the ECU according to the present embodiment.

FIG. 4 is a schematic diagram showing a third example of alighting notification that is performed by the ECU 20 according to the present embodiment. In the example shown in FIG. 4, it is assumed that occupants in the driver's seat 1, the passenger's seat 2, and the rear left seat 4 are about to open doors and get out of the vehicle. It is assumed that another vehicle in an area on the right side of the driver's vehicle is approaching the driver's vehicle from forward thereof.

When the alighting determination unit 22 has determined that an occupant will get out of the vehicle from one side of the vehicle, if the surrounding area determination unit 23 determines that a person or another vehicle in an area that is on the one side and is forward of the vehicle is approaching the vehicle, the CPU 21 lights up or blinks the front indicator lights. As shown in FIG. 4, for example, if another vehicle is approaching the driver's vehicle from the front right side of the driver's vehicle, the CPU 21 lights up or blinks the front right indicator light 31. Therefore, a person or another vehicle that is approaching the driver's vehicle from forward thereof can easily recognize the front right indicator light 31 provided on the front portion of the driver's vehicle, and avoid coming into contact with or hitting the door. Also, it is unnecessary to light up or blink the rear right indicator light 32, and therefore it is possible to reduce wasteful power consumption.

Figure 5:
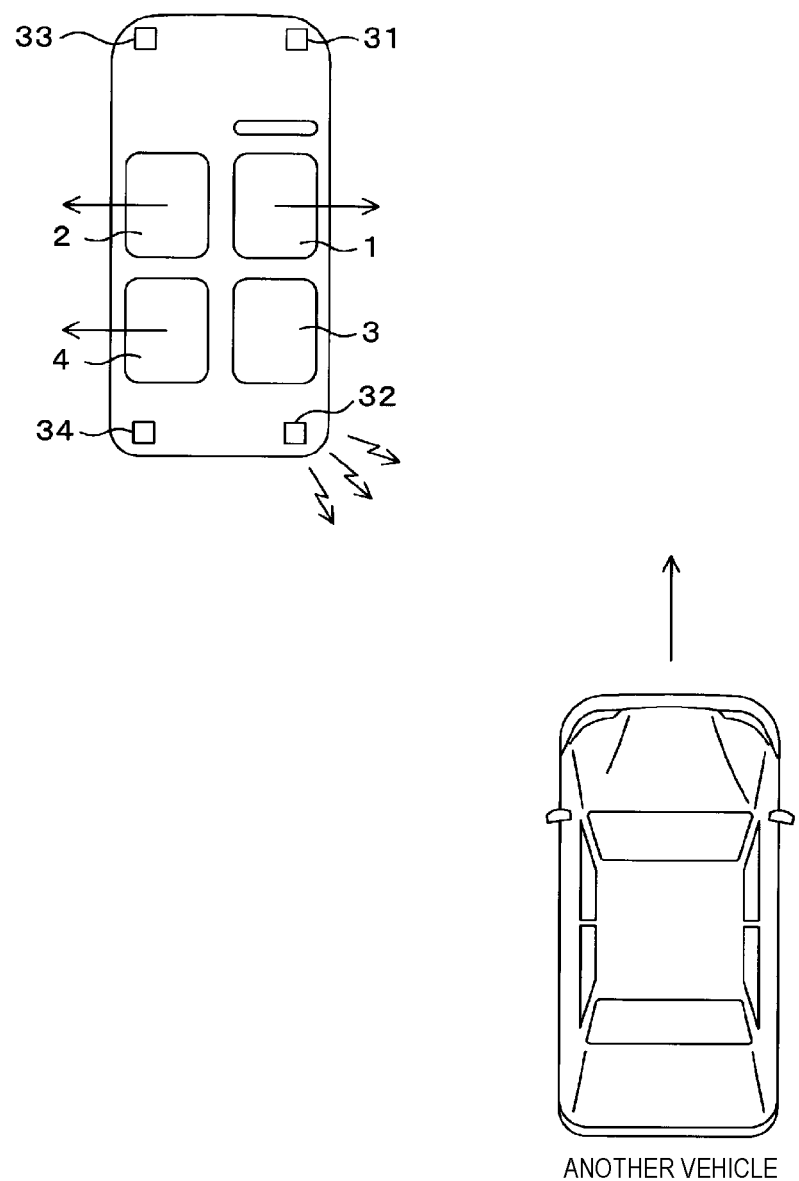
FIG. 5 is a schematic diagram showing a fourth example of alighting notification that is performed by the ECU according to the present embodiment.

FIG. 5 is a schematic diagram showing a fourth example of alighting notification that is performed by the ECU 20 according to the present embodiment. In the example shown in FIG. 5, it is assumed that occupants in the driver's seat 1, the passenger's seat 2, and the rear left seat 4 are about to open doors and get out of the vehicle. It is assumed that another vehicle in an area on the right side of the driver's vehicle is approaching the driver's vehicle from rearward thereof.

When the alighting determination unit 22 has determined that an occupant will get out of the vehicle from one side of the vehicle, if the surrounding area determination unit 23 determines that a person or another vehicle in an area that is on the one side and is rearward of the vehicle is approaching the vehicle, the CPU 21 lights up or blinks the rear indicator lights. As shown in FIG. 5, for example, if another vehicle is approaching the driver's vehicle from the rear right side of the driver's vehicle, the CPU 21 lights up or blinks the rear right indicator light 32. Therefore, a person or another vehicle that is approaching the driver's vehicle from rearward thereof can easily recognize the rear right indicator light 32 provided on the rear portion of the driver's vehicle, and avoid coming into contact with or hitting a door. Also, it is unnecessary to light up or blink the front right indicator light 31, and therefore it is possible to reduce wasteful power consumption.

Figure 6:
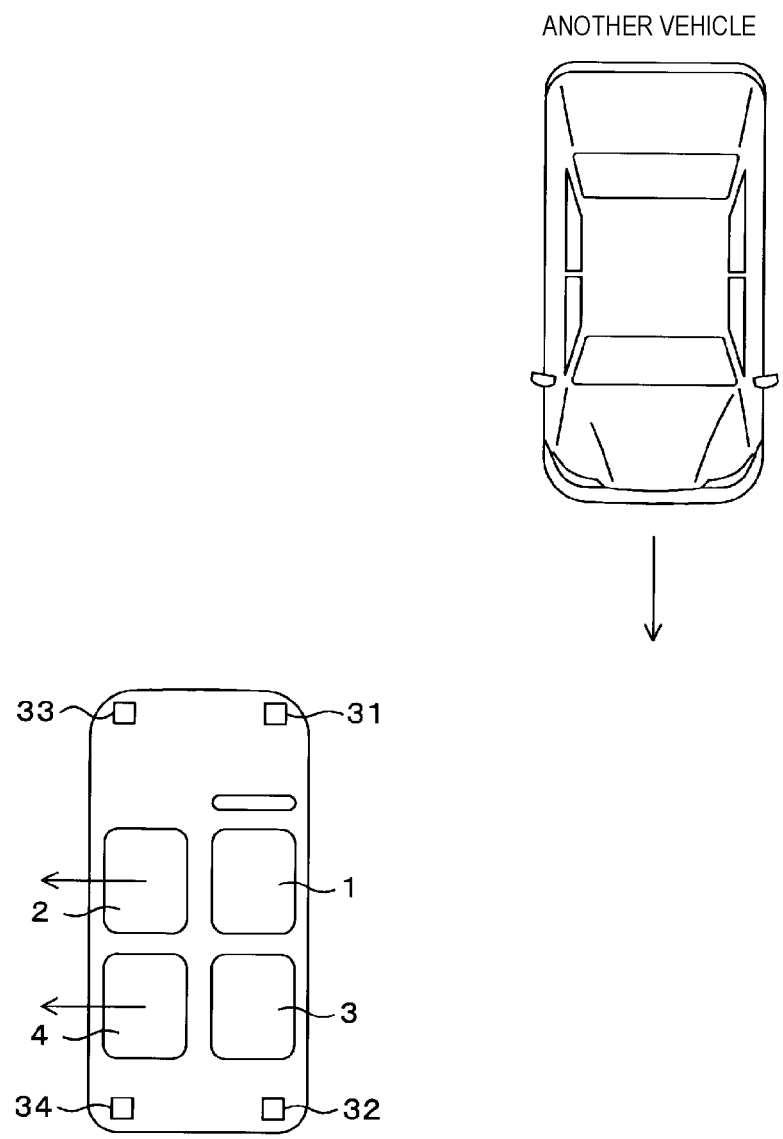
FIG. 6 is a schematic diagram showing a fifth example of alighting notification that is performed by the ECU according to the present embodiment.

FIG. 6 is a schematic diagram showing a fifth example of alighting notification that is performed by the ECU 20 according to the present embodiment. In the example shown in FIG. 6, it is assumed that occupants in the passenger's seat 2 and the rear left seat 4 are about to open doors and get out of the vehicle. It is assumed that another vehicle in an area on the right side of the driver's vehicle is approaching the driver's vehicle from forward thereof.

When the alighting determination unit 22 has determined that an occupant will get out of the vehicle from one side of the vehicle, if the surrounding area determination unit 23 determines that a person or another vehicle in an area on the other side of the vehicle is approaching the vehicle, the CPU 21 does not notify of alighting. As shown in FIG. 6, for example, if an occupant opens a door on the left side of the vehicle and gets out of the vehicle, that occupant will not open a door on the right side. Therefore, even if a person or a vehicle in an area on the right side of the vehicle is approaching the vehicle, there is no risk of a door coming into contact with or hitting the person or the other vehicle. As a result, unnecessary notification is not performed, and therefore it is possible to reduce wasteful power consumption.

Figure 7:
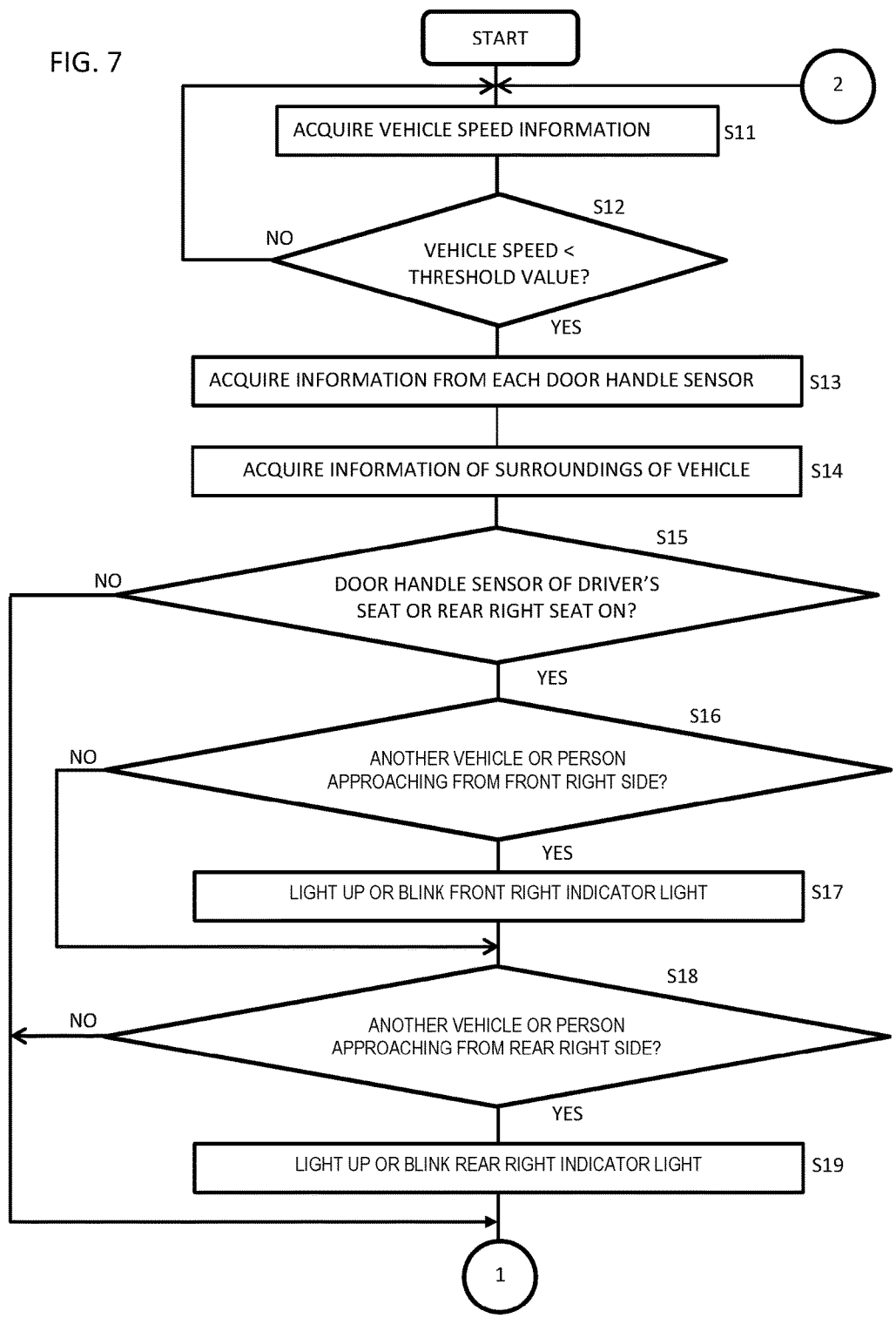
FIG. 7 is a flowchart showing an example of a processing procedure that is performed by the ECU according to the present embodiment.
Figure 8:
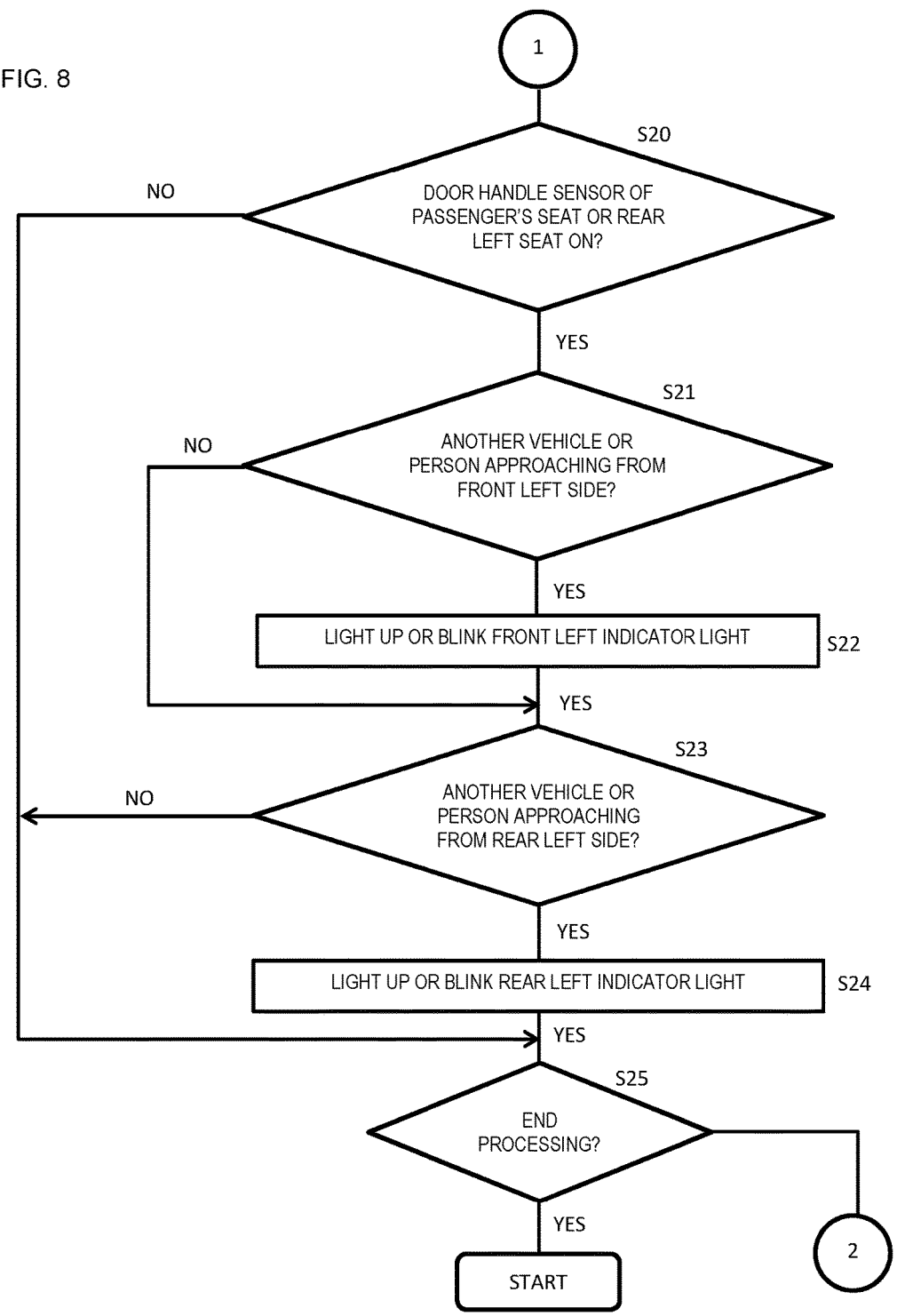
FIG. 8 is a flowchart showing an example of a processing procedure that is performed by the ECU according to the present embodiment.

Next, operations that are performed by the ECU 20 according to the present embodiment will be described. FIGS. 7 and 8 are flowcharts showing an example of a processing procedure that is performed by the ECU 20 according to the present embodiment. For the sake of convenience, it is assumed in the following description that the element that performs processing is the CPU 21. The CPU 21 acquires vehicle speed information from the vehicle speed sensor 11 (S11), and determines whether or not the speed of the driver's vehicle is lower than a threshold value (S12). The threshold value is used to determine whether or not the driver's vehicle has stopped, and, for example, is approximately equal to an acceptable error when the vehicle speed is 0 km/h.

If the vehicle speed is not lower than the threshold value (NO in S12), the CPU 21 continues performing the processing in step S11 and the subsequent steps. If the vehicle speed is lower than the threshold value (YES in S12), the CPU 21 determines that the driver's vehicle has stopped, acquires information (detection results) from each door handle sensor (S13), and acquires information of the surroundings of the vehicle (the driver's vehicle) (S14).

The CPU 21 determines whether or not the door handle sensor of the driver's seat 1 or the rear right seat 3 is ON (S15), and if the door handle sensor is ON (YES in S15), the CPU 21 determines whether or not a person or another vehicle is approaching the driver's vehicle from the front right side of the driver's vehicle (S16). If another vehicle or a person is approaching the driver's vehicle from the front right side of the driver's vehicle (YES in S16), the CPU 21 lights up or blinks the front right indicator light 31 (S17). If no other vehicles or people are approaching the driver's vehicle from the front right side of the driver's vehicle (NO in S16), the CPU 21 performs the processing in step S18, which will be described below, without performing the processing in step S17.

The CPU 21 determines whether or not another vehicle or a person is approaching the driver's vehicle from the rear right side of the driver's vehicle (S18). If another vehicle or a person is approaching the driver's vehicle from the rear right side of the driver's vehicle (YES in S18), the CPU 21 lights up or blinks the rear right indicator light 32 (S19). If no other vehicles or people are approaching the driver's vehicle from the rear right side of the driver's vehicle (NO in S18), or if the door handle sensor of the driver's seat 1 or the rear right seat 3 is not ON (NO in S15), the CPU 21 performs the processing in step S20, which will be described below.

The CPU 21 determines whether or not the door handle sensor of the passenger's seat 2 or the rear left seat 4 is ON (S20), and if the door handle sensor is ON (YES in S20), the CPU 21 determines whether or not another vehicle or a person is approaching the driver's vehicle from the front left side of the driver's vehicle (S21). If another vehicle or a person is approaching the driver's vehicle from the front left side of the driver's vehicle (YES in S21), the CPU 21 lights up or blinks the front left indicator light 33 (S22). If no other vehicles or people are approaching the driver's vehicle from the front left side of the driver's vehicle (NO in S21), the CPU 21 performs the processing in step S23, which will be described below, without performing the processing in step S22.

The CPU 21 determines whether or not another vehicle or a person is approaching the driver's vehicle from the rear left side of the driver's vehicle (S23). If another vehicle or a person is approaching the driver's vehicle from the rear left side of the driver's vehicle (YES in S23), the CPU 21 lights up or blinks the rear left indicator light 34 (S24). If no other vehicles or people are approaching the driver's vehicle from the rear left side of the driver's vehicle (NO in S23), or if the door handle sensor of the passenger's seat 2 or the rear left seat 4 is not ON (NO in S20), the CPU 21 performs the processing in step S25, which will be described below.

The CPU 21 determines whether or not to end processing (S25). If the CPU 21 makes a determination to not end processing (NO in S25), the CPU 21 continues performing the processing in step S11 and the subsequent steps. If the CPU 21 makes a determination to end processing (YES in S25), the CPU 21 ends processing.

As described above, according to the present embodiment, when an occupant gets out of the driver's vehicle, the situation around the driver's vehicle is determined and whether or not there is the possibility of a door coming into contact with or hitting a person or another vehicle when the occupant gets out of the driver's vehicle is determined. Therefore, it is possible to reliably perform alighting notification without performing unnecessary alighting notification. That is, alighting notification is performed only when necessary, and it is possible to reduce wasteful power consumption.

In the above-described embodiment, when a door handle sensor has been turned on and an indicator light is caused to light up or blink, if an occupant does not further open the door and closes the door, for example, the indicator light that has been caused to light up or blink may be turned off. As a result, it is possible to avoid performing unnecessary notification.

The present embodiment is configured to, for example, light up or blink an indicator light of the driver's vehicle when another vehicle is approaching the driver's vehicle. However, the present invention is not limited to such a configuration, and it is possible to use inter-vehicle communication between the driver's vehicle and another vehicle that is approaching the driver's vehicle, to output/display information indicating that an occupant of the driver's vehicle will get out of the driver's vehicle, to/on a speaker or a display panel that is provided for the other vehicle.

The invention claimed is:

1. An alighting notification device comprising:
   an alighting determination unit that determines whether or not an occupant will get out of a vehicle;
   a surrounding area determination unit that determines whether or not a person or another vehicle in a surrounding area around the vehicle is approaching the vehicle; and
   a notification unit that notifies of alighting based on a result of determination by the alighting determination unit and a result of determination by the surrounding area determination unit;
   wherein the notification unit is configured to,
      if the alighting determination unit determines that an occupant will get out of the vehicle from one side of the vehicle, and the surrounding area determination unit determines that a person or another vehicle in an area that is on the one side and is forward of the vehicle is approaching the vehicle, light up or blink a front indicator light that is provided on the one side of the vehicle, and
      if the alighting determination unit determines that an occupant will get out of the vehicle from one side of the vehicle, and the surrounding area determination unit determines that a person or another vehicle in an area that is on the one side and is rearward of the vehicle is approaching the vehicle, light up or blink a rear indicator light that is provided on the one side of the vehicle.

2. The alighting notification device according to claim 1, wherein the notification unit is configured to notify of alighting if the alighting determination unit determines that an occupant will get out of the vehicle from one side of the vehicle, and the surrounding area determination unit determines that a person or another vehicle in an area on the one side is approaching the vehicle.

3. The alighting notification device according to claim 1, wherein the notification unit is configured to, if the alighting determination unit determines that an occupant will get out of the vehicle from one side of the vehicle, and the surrounding area determination unit determines that a person or another vehicle in an area on the one side is approaching the vehicle, light up or blink an indicator light that is provided on the one side of the vehicle.

4. The alighting notification device according to claim 1, wherein the notification unit is configured to not notify of alighting if the alighting determination unit determines that an occupant will get out of the vehicle from one side of the vehicle, and the surrounding area determination unit determines that a person or another vehicle in an area on the other side of the vehicle is approaching the vehicle.

5. The alighting notification device according to claim 2, wherein the notification unit is configured to, if the alighting determination unit determines that an occupant will get out of the vehicle from one side of the vehicle, and the surrounding area determination unit determines that a person or another vehicle in an area on the one side is approaching the vehicle, light up or blink an indicator light that is provided on the one side of the vehicle.

6. The alighting notification device according to claim 2, wherein the notification unit is configured to not notify of alighting if the alighting determination unit determines that an occupant will get out of the vehicle from one side of the vehicle, and the surrounding area determination unit determines that a person or another vehicle in an area on the other side of the vehicle is approaching the vehicle.

7. The alighting notification device according to claim 3, wherein the notification unit is configured to not notify of alighting if the alighting determination unit determines that an occupant will get out of the vehicle from one side of the vehicle, and the surrounding area determination unit determines that a person or another vehicle in an area on the other side of the vehicle is approaching the vehicle.

* * * * *